(12) United States Patent
Hakki et al.

(10) Patent No.: US 10,392,013 B2
(45) Date of Patent: Aug. 27, 2019

(54) COLLISION DETECTION AND AVOIDANCE SYSTEM

(71) Applicants: A-Hamid Hakki, Dunedin, FL (US);
Maryam Hakki, Dunedin, FL (US);
Dina A. Hakki, Dunedin, FL (US);
Belmina Hakki, Dunedin, FL (US)

(72) Inventors: A-Hamid Hakki, Dunedin, FL (US);
Maryam Hakki, Dunedin, FL (US);
Dina A. Hakki, Dunedin, FL (US);
Belmina Hakki, Dunedin, FL (US)

( * ) Notice: Subject to any disclaimer, the term of this patent is extended or adjusted under 35 U.S.C. 154(b) by 2 days.

(21) Appl. No.: 15/721,752

(22) Filed: Sep. 30, 2017

(65) Prior Publication Data
US 2019/0100198 A1    Apr. 4, 2019

(51) Int. Cl.
*B60W 30/095*    (2012.01)
*G08G 1/16*    (2006.01)
*B60W 50/14*    (2012.01)
*G02B 27/01*    (2006.01)
*G01S 13/93*    (2006.01)

(52) U.S. Cl.
CPC ........ *B60W 30/0956* (2013.01); *B60W 50/14* (2013.01); *G01S 13/931* (2013.01); *G02B 27/0103* (2013.01); *G08G 1/166* (2013.01); *G08G 1/167* (2013.01); *B60W 2050/146* (2013.01); *B60W 2550/302* (2013.01); *B60W 2550/308* (2013.01); *G01S 2013/9353* (2013.01); *G01S 2013/9375* (2013.01); *G01S 2013/9378* (2013.01)

(58) Field of Classification Search
None
See application file for complete search history.

(56) References Cited

U.S. PATENT DOCUMENTS

| | | | |
|---|---|---|---|
| 5,948,035 A * | 9/1999 | Tomita | B60T 8/172 180/197 |
| 6,733,134 B2 | 5/2004 | Bleiner | |
| 7,049,978 B2 | 5/2006 | Li | |
| 7,375,621 B1 | 5/2008 | Hines | |
| 9,221,392 B2 | 12/2015 | Chen | |
| 9,221,509 B2 | 12/2015 | Lai | |
| 9,799,223 B2 * | 10/2017 | Nespolo | G08G 1/166 |

(Continued)

*Primary Examiner* — Steven Lim
*Assistant Examiner* — Sara B Samson
(74) *Attorney, Agent, or Firm* — Larson & Larson, P.A.; Frank Liebenow; Justin P. Miller (57) ABSTRACT

A system and method for detecting and avoiding a collision includes measuring speed of one or more vehicles and at least one parameter indicating road surface and condition, weather, and tire pressure. Rear image dimensions are proportional to the speed of the trailing vehicle and front image dimensions are proportional to the speed of the index vehicle. The timing of the projected images will allow for safe deceleration of trailing and of the index vehicles
The images are projected either as flat images on the roadway or three-dimensional (holographic) images. The occurrence and severity of a collision is defined by the rate of change in dimensions of the projected images that exceeds a predetermined value corresponding to a deceleration or acceleration of more than 1.1 g. Collision data measured by vehicle or extra vehicular (such as GPS) sensors are instantly stored and transmitted to the police department and emergency medical services.

24 Claims, 10 Drawing Sheets

(56) References Cited

U.S. PATENT DOCUMENTS

| | | | |
|---|---|---|---|
| 2005/0259033 A1* | 11/2005 | Levine | B60K 26/00 345/7 |
| 2007/0159311 A1* | 7/2007 | Schober | B60Q 1/525 340/435 |
| 2008/0219014 A1 | 9/2008 | Loibl | |
| 2010/0253493 A1* | 10/2010 | Szczerba | G01S 13/723 340/435 |
| 2010/0283590 A1 | 11/2010 | Tee et al. | |
| 2010/0290774 A1 | 11/2010 | Matsuoka | |
| 2012/0112635 A1 | 5/2012 | Cho | |
| 2014/0095061 A1* | 4/2014 | Hyde | G01S 17/023 701/300 |
| 2014/0267415 A1* | 9/2014 | Tang | G06T 11/60 345/633 |
| 2015/0166072 A1* | 6/2015 | Powers | B60W 40/06 701/1 |
| 2016/0096486 A1* | 4/2016 | Dziurda | B60S 1/54 348/375 |
| 2017/0101147 A1* | 4/2017 | Hasegawa | B60Q 1/346 |
| 2017/0113604 A1* | 4/2017 | Asaoka | B60Q 1/34 |
| 2018/0072220 A1* | 3/2018 | Yan | G08G 1/166 |

\* cited by examiner

COLLISION DETECTION AND AVOIDANCE SYSTEM

FIELD

This invention relates to the field of motor vehicles and more particularly to a system for detecting and avoiding collisions.

BACKGROUND

Today, vehicles such as cars, boats, and aircrafts move at speeds that expose their occupants to the risk of body injury and death in the event of a collision. Car accidents are a major cause of morbidity and mortality. Annually, about 3 million people are injured, many are permanently disabled and many die as a result of their injuries. Seatbelts and inflatable safety devices (air bags) have undoubtedly saved innumerable lives. However, one issue with airbags is that they are deployed after a collision and not before.

Measures to prevent collisions are far more valuable in saving lives than measures deployed after a crash. Sensors have been utilized to prevent accidents such as using ultrasound, video cameras, lasers and radar. However, signals/alarms emanating from monitoring these sensors are available only to the driver of the vehicle into which they are integrated, and not to drivers of other vehicles. In addition, once a collision has occurred, there is currently no reliable method to immediately discover and report the accident.

Fender benders are the most common type of motor vehicle accidents. Two million or more occur each year, in parking lots, when backing up into oncoming traffic, or when stopping suddenly. Although rarely a cause of serious injuries, fender benders often result in costly repairs and increased in insurance rates. In order to prevent Fender Benders, a variety of technologic advances have been deployed. Recently, forward-collision detection and lane-departure electronic signals warn the driver of the vehicle to take corrective action, usually by a visual and/or audible warning whenever a car strays from its lane or gets too close to the car ahead. Color coding of the closeness to the car ahead helps to alert the driver as to the distance ahead, green, yellow and red. These warnings are often muted at low speeds, such as less than 15 miles per hour. Forward-collision detection and lane-departure detection systems typically rely on radar, ultrasound, or camera imaging.

Tailgating is responsible for more than one third of all motor vehicle accidents. Tailgating is defined as a vehicle encroaching on the safe space between that vehicle and a leading vehicle (the car ahead of you). When tailgating occurs, it is often impossible to stop your vehicle in the event that the leading vehicle decelerates suddenly, resulting in a collision. This "safe" distance varies with several factors such as speed of vehicle, road conditions, darkness (ambient light), and weather conditions. Current sensors are available to estimate this "safe" distance, but the information is only available to the driver of the vehicle on which those sensors are integrated. Safety tips such as maintaining a distance between your vehicle and the leading vehicle (e.g. car ahead of you) often suggest keeping 10 feet of distance for every 10 mile per hour of speed. For instance, 60 feet is deemed a safe distance for speeds of 60 mph. This distance increases during inclement weather. There is also a two second rule between the vehicle and the leading vehicle as each passes a stationary object (e.g. a light post or a road sign). This relies on the driver accurately measuring two seconds between when the leading vehicle passes the stationary object and when the driver's vehicle passes the stationary object. The two second rule applies to dry road conditions, as four seconds is recommended for wet roads, and ten seconds for snow or ice covered roads. Tailgating is not only illegal but also causes serious and fatal accidents.

Drivers of vehicles backing up in a parking lot have difficulty seeing pedestrians or other vehicles in the line of travel. Similarly drivers parking (looking for a parking space) and pedestrians have difficulty seeing cars that are backing out of parking spaces.

Many vehicular accidents are avoidable. Often, a driver of a first vehicle (index vehicle) is following too close behind a second vehicle and, when the second vehicle slows down or stops, the driver of the first vehicle (index vehicle) has insufficient time to stop, thereby resulting in a collision.

Drivers are human, and each driver constantly makes driving decisions based upon speed, road conditions, traffic, etc. It is often recommended that one maintain at least one car length per ten miles per hour, but it is often difficult to determine five or six car lengths, as this is an imaginary distance and based on a fictional car size as imagined by the driver. Other than vehicle velocity, stopping distance is impacted by the road surface, road conditions (e.g. wet, snow, ice), tire conditions, vehicle load, tire condition, tire pressure, brake shoe wear, etc. These factors also apply to self-driving vehicles.

To this, it is difficult for a driver to know what a safe following distance might be given such diverse condition. Yet, driving at a safe distance from other vehicles is critical to avoiding accidents.

There have been some limited attempts to provide a system that projects an image onto the roadway for helping with distance control between vehicles. For example, U.S. Pat. No. 9,221,509 to Lai for a Display Apparatus and Vehicle Having Projector Device has a display projection system for a vehicle that presents data on a roadway surface in front of the vehicle. The shape, size, and/or location of the projected image are not dynamic and do not change based upon vehicle speed, road conditions, steering wheel rotation, etc., and therefore cannot be relied upon to reliably prevent collisions U.S. Pat. Publication 2008/0219014 to Loibi for a Bicycle Bumper with a Light Generating a Bike Lane has a light emitter on a bicycle that emits a pattern indicating to other bikers an unsafe passing area. Again, this is a static pattern that does not change based upon bicycle speed, road conditions, steering direction, etc.

What is needed is a system that will inform drivers of dynamic zones of safe distances between vehicles.

SUMMARY

The system alerts drivers of following vehicles that they are tailgating the index vehicle and the system also alerts the driver of the index vehicle when the index vehicle gets too close to a leading vehicle or to a vehicle in an adjacent lane. In some embodiments, a dynamic image is displayed to alert the offending driver. The dynamic image is a projected dynamic image (in space or on the pavement) indicating a safe inter-vehicle distance. The dynamic image that is displayed is dependent upon stored data regarding the vehicle (e.g. vehicle weight, size, braking ability, acceleration ability, etc.) and current conditions (e.g. speed of the index vehicle, speed of the following vehicle, brake wear, tire wear, tire pressure, speed, road conditions, darkness, time-of-day, etc.).

In some embodiments, a projected image is projected when a vehicle backs out of a parking space, warning pedestrians and drivers of other vehicles that the vehicle is about to enter their path of travel. Similarly, mechanisms are provided to assist the driver of the vehicle that backs out of a parking space so that the driver can better see pedestrians and the other vehicles approaching.

In some embodiments, a video record of the encroaching vehicle is maintained. This video record serves as a deterrent if a complaint is issued to law enforcement as supported by such video record.

When driving at high way speeds, there is no reliable way for a human driver to determine safe distances between vehicles. Counting two seconds and using a reference point is a approximation and even less reliable when road conditions such as rain or snow is a factor. The disclosed system continuously and accurately measures a safe inter-vehicle distance, both in front and behind the vehicle. This "safety zone" is then shared with other vehicles by projecting a flat image or hologram showing the "safety zone." This projection is visible to the driver of the vehicle as well as drivers of nearby vehicles that are potential sources of a collision. The flat image or holographic image is emitted automatically. The size of the "safety zone" is calculated using a computer that calculates safe distances to other vehicles based upon factors such as speed, inertia, tire condition, driver experience, road conditions (wet, dry, snow-covered, ice-covered, etc.), and weather. The flat image or holographic image will be an aid to all vehicles indicative of safe paths and speeds. In some embodiments, video cameras document violations such as tailgating by another driver.

In some embodiments, the flat image or holographic image is bent or curved to reflect turning directions such as U-turns or left turns.

In some embodiments, parking assistance is provided projecting vehicle dimensions relative to the available parking space, to help guide the driver to fit within the parking space.

The flat image's and/or holographic image's dimensions expand or shrink as dictated by weather conditions such as rain, snow or fog, as well as road conditions (e.g. wet, dry, snow-covered, ice-covered), status of the tires, and driver experience.

In some embodiments, the flat image's and/or holographic image's dimensions expand or shrink as dictated by the speed of a trailing vehicle with respect to the speed of the index vehicle that is projecting the flat image and/or holographic image.

In some embodiments, the anterior (front) flat image and/or holographic image is displayed with a dimension proportional to the speed of the index vehicle as the index vehicle approaches the vehicle that is ahead in order to allow for safe deceleration. The image is activated when the speed of the index vehicle exceeds the speed of the vehicle ahead and the distance between the two vehicles approaches a critical distance below which safe deceleration of the vehicle is problematic. For example, the image is displayed anteriorly (forward) once the vehicle is at a speed and distance as to not be able to decelerate safely in the event that the vehicle ahead suddenly decelerates or stops. In some embodiments, if the vehicle's speed is less than the speed of the vehicle ahead, and the distance between the two vehicles exceeds a distance needed for safe deceleration, then the flat image and/or holographic image is not be displayed.

In some embodiments, the generation of the flat images and/or holographic images is blanked for certain vehicle speeds in the forward direction. For example, the flat images and/or holographic images is emitted only at speeds in a forward direction that exceed 15 miles per hour.

In some embodiments, the dimensions of the flat and/or holographic image of the index vehicle posteriorly is activated based on the speed of a trailing vehicle traveling at speeds greater than the speed of the index vehicle, but the image is not displayed until the trailing vehicle approaches a distance below which safe deceleration in not feasible.

In some embodiments generation of the flat images and/or holographic images is triggered by shifting into reverse such as when exiting from a parked position, regardless of speed.

Some embodiments provide a panoramic video display from a rear camera mounted to a flexible rod that telescopes in a rearward direction when the vehicle is shifted into reverse as when exiting from a parked position.

In some embodiments, the system includes an audio/video image recording system having rapid sequence film cameras located inside and outside of the vehicle. The audio/video images associated with imminent collision are stored in a memory unit.

In some embodiments, the rear camera telescopes outwardly when backing up and is equipped with sensors in order to determine the safety of telescoping against objects or pedestrians.

The sensor system deployed inside, on, and outside on the body of the vehicle includes a plurality of sensors, such as radar, lasers, ultrasound devices, infrared devices, Doppler sensors, etc. The sensors provide data to a processor indicating, for example, the vehicle speed, deceleration rate, wind speed, time to impact, distance to an obstacle, etc. Other parameters are pre-determined and stored as data by the vehicle manufacturer such as weight of the vehicle, dimensions of the vehicle, maximum acceleration, brake performance, etc.

In one embodiment, an accident avoidance system is disclosed including an image projection system interfaced to a rear surface of an index vehicle. The image projection system is operative to project an image behind the index vehicle. One or more sensors are interfaced to the index vehicle for obtaining sensor data related to a speed of the vehicle, road conditions (e.g. wet, dry, snow-covered, ice-covered), weather (e.g. rain, snow, fog, sleet), ambient lighting conditions (e.g. daylight, darkness, nighttime road lighting), tire pressure, brake wear, etc. The system includes a computer that has preprogrammed data regarding the index vehicle (e.g. brake performance, vehicle weight, stopping ability of the vehicle, and tire configuration). The computer is interfaced to the one or more sensors for obtaining the sensor data that includes at least a speed of the index vehicle. The computer is also coupled to the image projection system for controlling projection of the image. The computer has software that calculates a size of a safety zone based upon the preprogrammed data and the sensor data (including the speed of the vehicle) and then the software controls the image projection system to project an image behind the index vehicle that is proportional to the size of the safety zone.

In another embodiment, a method of avoiding an accident includes measuring a speed of the index vehicle and at least one parameter selected from the group consisting of a road surface type, a road condition, a weather, and tire pressure. A rear safety zone is calculated from the speed of the index vehicle or the delta speed of the index vehicle relative to other vehicles, and at least one preprogrammed parameter related to the vehicle and an image is projected behind the index vehicle. The size of the image projected behind the index vehicle is proportional to the speed of the trailing vehicle, but in some embodiments, the image is not be displayed until the trailing vehicle approaches the rear safety zone defined as the distance needed for safe deceleration of the trailing vehicle. The image provides a visual reference for the vehicle that is following the index vehicle to judge a safe following distance.

In another embodiment, an accident avoidance system is disclosed including an image projection system interfaced to an index vehicle. The image projection system is configured to project an image behind the index vehicle. The system includes one or more sensors that are interfaced to the index vehicle and a computer. The computer has preprogrammed data regarding the index vehicle (e.g. brake performance, vehicle weight, and tire configuration), as well as data regarding an average trailing vehicle. The computer is interfaced to the one or more sensors, obtaining sensor data from the one or more sensors such as sensors that measure a speed of the index vehicle, a speed of a trailing vehicle, road conditions (e.g. wet, dry, snow-covered, ice-covered), weather (e.g. rain, snow, fog, sleet), ambient lighting conditions (e.g. daylight, darkness, nighttime road lighting), tire pressure, brake wear, etc. The computer is operatively coupled to the image projection system for controlling projection of the image. Software is executed by the computer to calculate a size of a safety zone based upon the preprogrammed data and the sensor data and to control the image projection system to project an image behind the index vehicle that is the size of the safety zone.

In another embodiment, the index vehicle is equipped with cameras and sensors that determine the type and specs of the trailing vehicle, such as whether it is a truck, a bus or a minivan to estimate the safe deceleration distance based on published data.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Throughout this description, the term vehicle is any motorized or manually operated vehicle, including, but not limited to, automobiles, motorcycles, bicycles, trucks, etc. Also, throughout this description, the term "index vehicle" is used to identify the vehicle that is equipped with the described system as opposed to the leading vehicle (that which is in front of the index vehicle) or trailing vehicle (that which is behind the index vehicle).

Throughout this description, one typical vehicle control system is used as an example of integrating the system for avoiding accidents into a vehicle. It is fully anticipated that any vehicle control system is present in any target vehicle and the system for avoiding accidents is either integrated into the vehicle control system or operates side-by-side with the vehicle control system or operates independently of the vehicle control system.

Prior art "dynamic imaging" refers to generation of unlimited versions and changing the size and format of images using one master file (Dynamic Media Classic).

The term "dynamic imaging" is defined as imaging of a vehicle that is projected on or above the ground (such as a road) in front, behind or beside the vehicle and has dimensions that increase or decrease depending on parameters such speed of the index vehicle, and speed of a trailing vehicle, as well as the difference (delta) speeds of the index vehicle to other vehicles, in order to provide an accurate visual safety zones surrounding a vehicle. The dynamic image is displayed posteriorly once the trailing vehicle approaches a safety deceleration zone depending on the speed of the trailing vehicle relative to the speed of the index vehicle. Similarly, the dynamic image is displayed anteriorly with dimensions proportional to the speed of the index vehicle once the distance to the vehicle ahead approaches the safety deceleration zone of the index vehicle. The rate of change in the dynamic image dimensions corresponds to acceleration and deceleration. The acceleration and/or deceleration also provide an accurate indicator of the occurrence as well as the severity of a collision. For example, any acceleration or deceleration that exceeds 1.1 g is likely the result of a collision, and the severity increases with the increase in the gravitational force, such as above 10 or 15 g.

The system for avoiding accidents is based on current theory and concept. Standard safety precautions must always be followed. The persons or corporations implementing the disclosed invention are responsible for providing accurate information to those using this system (drivers), particularly as it pertains to risks versus potential benefits.

Referring to FIGS. 1 through 7, the operation of the system for avoiding accidents will be explained. In order to avoid accidents, it is important to maintain a safe distance between vehicles in order to provide sufficient time to react to unexpected events such as an animal entering the roadway, traffic congestion, etc. Many people use one car-length per ten miles per hour of speed as a rule of thumb. This is a good rule, but it is often difficult for a driver to judge the length of a car. Further, the stopping time of a vehicle varies based upon factors other than speed of the vehicle such as tire condition, road conditions, temperature, etc. So, even if there was a way for a driver to accurately judge six car lengths when driving at 60 miles per hour, more space is required when it is raining, icy, on gravel road, when one's tires are worn, etc.

To overcome the inaccuracies and misjudgments of having the driver continuously judge an appropriate distance, the system for avoiding accidents calculates the appropriate distances based upon various data and sensor data and projects either a hologram or a flat image on a roadway surface 6 showing the suggested distances between vehicles. Note that there is no limitation on the type of roadway surface ranging from asphalt, concrete, gravel, sand, grass fields, cobble stone, etc., each having different stopping characteristics.

Figure 1:
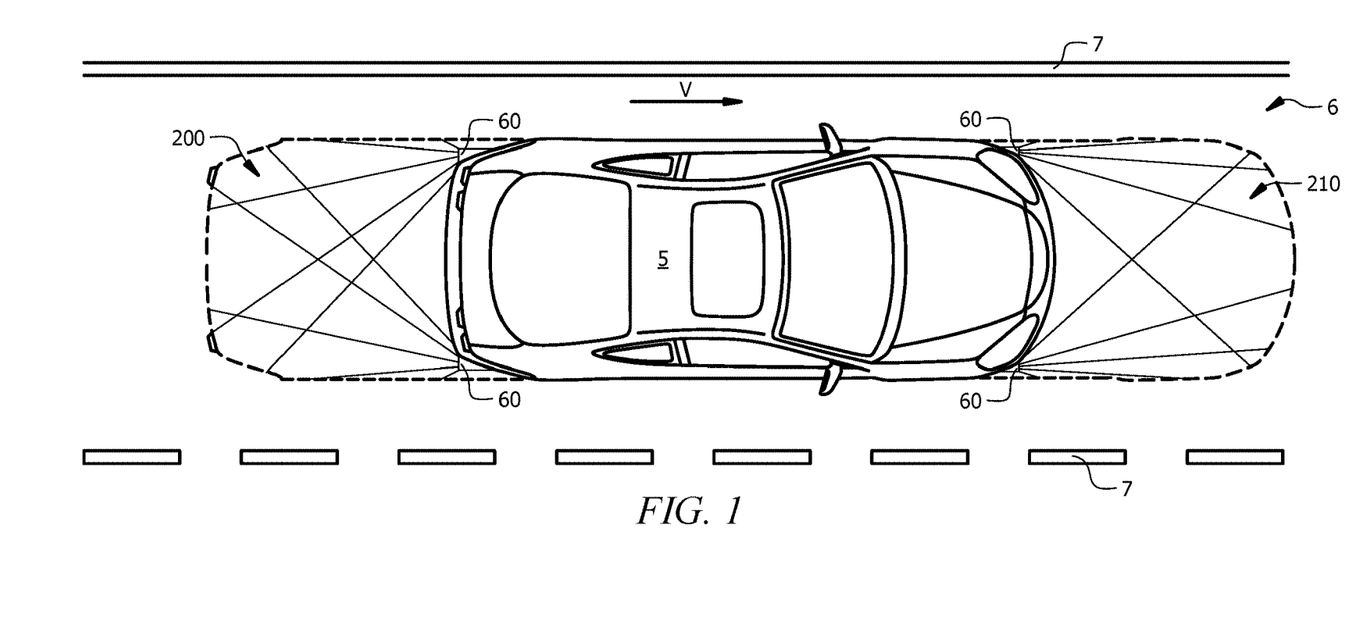
FIG. 1 illustrates a schematic view of a vehicle with illumination zones of the system for avoiding accidents.

In FIGS. 1-7, an index vehicle 5 is shown traveling on the roadway surface 6 (for clarity, in FIGS. 1-6, the index vehicle 5 is traveling generally from left to right within a lane between lane markers 7). In FIG. 1, a rear safety zone 200 and a front safety zone 210 are projected by one or more projectors 60, typically laser projectors. A size of the front safety zone 210 and the rear safety zone 200 is determined by a processor 70 (see FIG. 9) analyzing stored data (e.g. vehicle weights, vehicle dimensions, vehicle stopping distance on dry pavement, tire age . . . ) and data from one or more sensors such as a camera 93, microphone 95, ambient light sensor 50, roadway condition sensor 48, speed sensor 40, etc. (see FIG. 9). The processor then controls the one or more projectors 60 to project an image or outline on the pavement that represents a safe inter-vehicle distance based upon the stored data and data from the sensors. For example, if based upon the stored data, the stopping distance of the index vehicle 5 at 60 miles per hour is 80 feet on dry pavement, and then the front safety zone 210 will be projected on the road, occupying approximately 80 feet in front of the index vehicle 5. If it is determined from the data from the sensors that the road is wet (e.g. from rain), then a greater stopping distance is calculated based upon the wet surface and, for example, a the front safety zone 210 will be projected on the road, occupying, for example, approximately 120 feet in front of the index vehicle 5.

Similarly, for example, if based upon the stored data, the stopping distance of a trailing vehicle at 60 miles per hour is 80 feet on dry pavement, then the posterior safety zone 200 will be projected on the road, occupying approximately 80 feet behind the index vehicle 5. If it is determined from the data from the sensors that the road is wet (e.g. from rain), then a greater stopping distance for the trailing is calculated based upon the wet surface and, for example, a the posterior safety zone will be projected on the road, occupying, for example, approximately 120 feet behind the index vehicle 5. The image is projected once the trailing vehicle approaches the safety deceleration zone of an average trailing vehicle based on its speed and road conditions.

Figure 2:
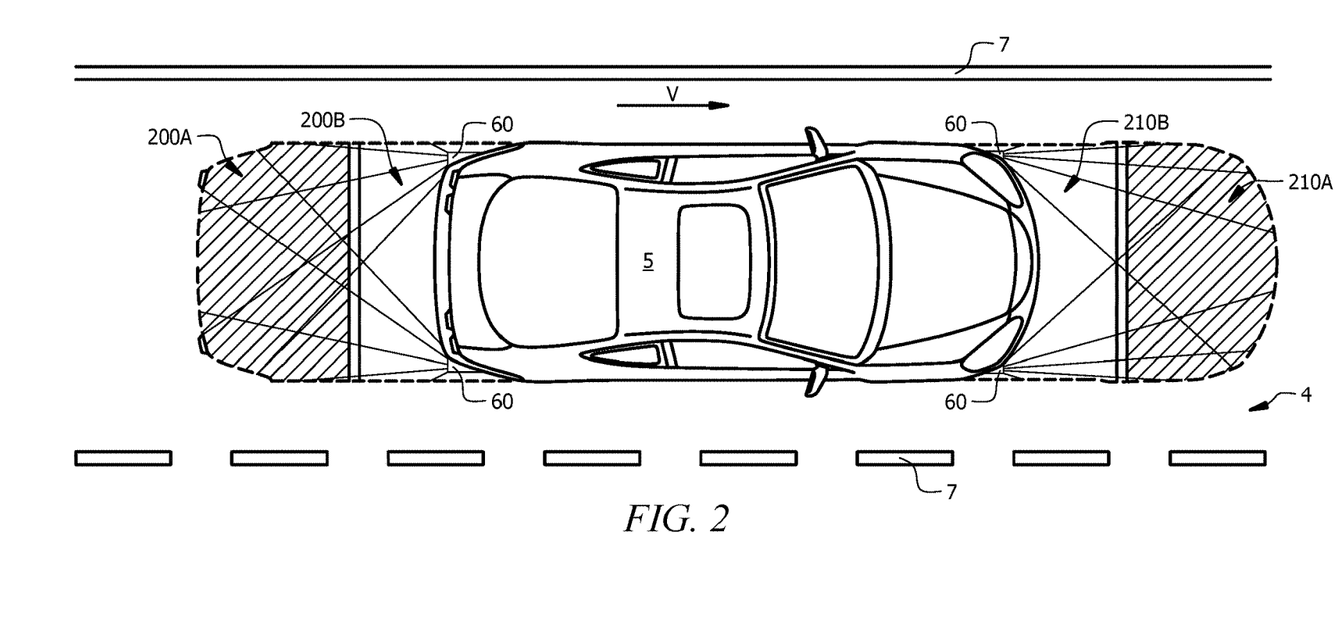
FIG. 2 illustrates a second schematic view of a vehicle with illumination zones of the system for avoiding accidents.

In some embodiments, the rear safety zone 200 and a front safety zone 210 are projected by one or more projectors 60 that have the ability to project multiple colors, typically laser projectors. In FIG. 2, the rear safety zone 200 includes two differently colored/shaded areas, a warning area 200A and a danger area 200B. For example, the warning area 200A is projected in yellow and a danger area 200B is projected in red. Likewise, also in FIG. 2, the front safety zone 210 includes two differently colored/shaded areas, a warning area 210A and a danger area 210B. For example, the warning area 210A is projected in yellow and a danger area 210B is projected in red. There is no limitation on the colors used, the number of zones, the use of patterns instead of colors, etc.

Figure 3:
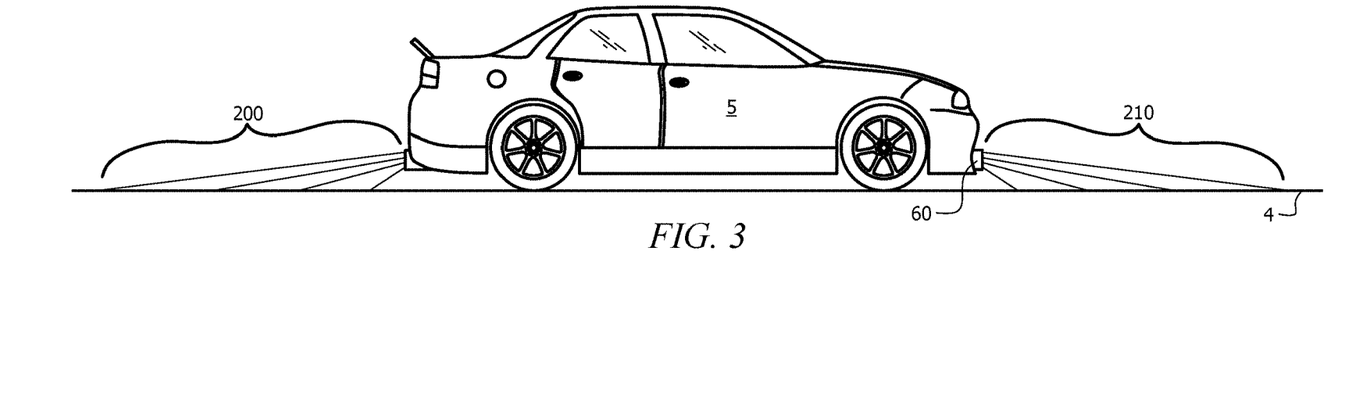
FIG. 3 illustrates an elevation view of a vehicle with illumination zones of the system for avoiding accidents.

In FIG. 3, a side elevation view of the projection of the front safety zone 210 and the rear safety zone 200 is shown.

Figure 4:
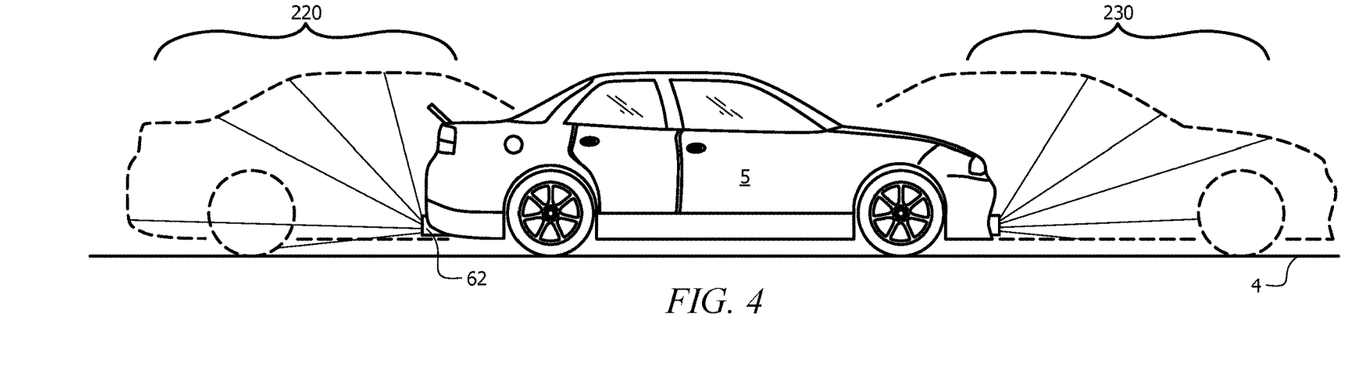
FIG. 4 illustrates a second elevation view of a vehicle with illumination zones of the system for avoiding accidents.

In FIG. 4, a side elevation view of the projection of the front safety zone hologram 230 and the rear safety zone hologram 220 is shown. In this example, holograms 220/230 are projected in the space in front and behind the index vehicle 5 to provide an image of a larger vehicle to better warn the driver of a safe following distance and to better warn other drivers of a safe distance between those driver's vehicles and the index vehicle 5. In this example, hologram projectors 62 project the front safety zone hologram 230 and the rear safety zone hologram 220 under control of the processor 70.

Figure 5:
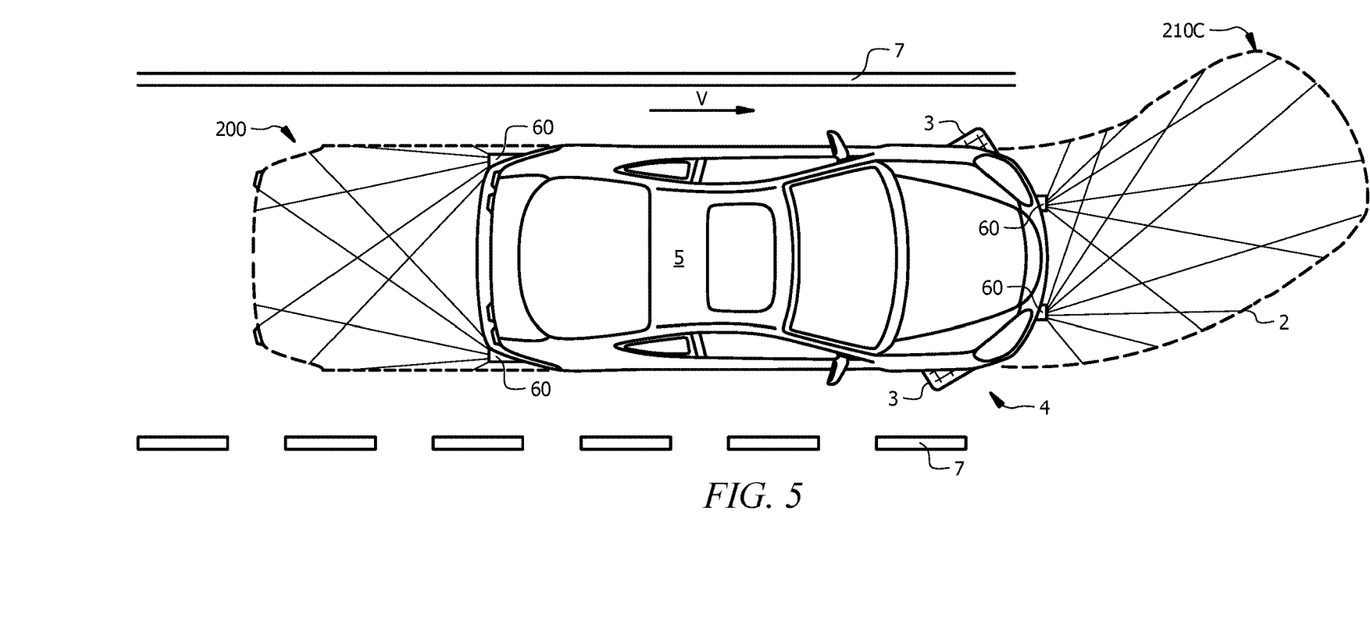
FIG. 5 illustrates a third schematic view of a vehicle with illumination zones of the system for avoiding accidents.

In FIG. 5, it is shown how the front safety zone 210 changes shape into a curved front safety zone 210C as the driver turns the steering wheel of the index vehicle 5, as shown by the front tires 3 being at an angle with respect to the traveling direction of the index vehicle 5. In this, the curved front safety zone 210C is shaped and sized to warn others, including pedestrians, and to warn the driver of the index vehicle 5 as to the path of the index vehicle 5 and how much space is required for the index vehicle 5 to safely stop.

Figure 6:
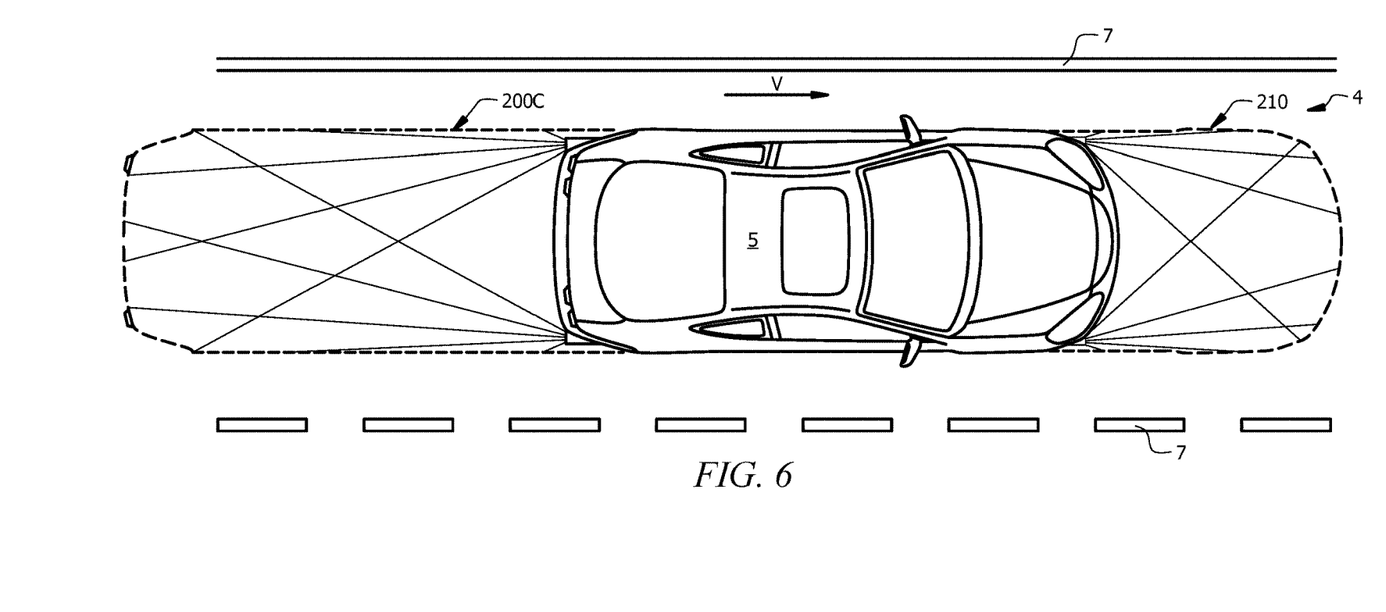
FIG. 6 illustrates a fourth schematic view of a vehicle with illumination zones of the system for avoiding accidents.

In FIGS. 1-4, the rear safety zone 200 and a front safety zone 210 are projected by one or more projectors 60 or hologram projectors 62 based upon a first set of data. The processor controls the one or more projectors 60 and/or hologram projectors 62 to project an image or outline on or above the pavement that represents a safe inter-vehicle distance based upon the stored data and data from the sensors (e.g. a flat image on the pavement or a holographic image above the pavement). For example, in FIGS. 1-4, the rear safety zone 200 is of a size based upon the stored data, the stopping distance of the index vehicle 5 at a first set of conditions (e.g. speed, pavement type, pavement conditions, tire conditions, etc.). In FIG. 6, a longer rear safety zone 200C is projected on the road surface 4, informing following vehicles that more inter-vehicle stopping distance is needed between the following vehicle and the index vehicle 5, based upon current conditions.

Again, the size of the rear safety zone 200 and a front safety zone 210 as projected by one or more projectors 60 or hologram projectors 62 is dependent upon various stored data and measured data from sensors. In one example, one of the sensors is an accelerometer 51 (see FIG. 9). In such, the acceleration of the index vehicle 5 is readily available. Using data from the accelerometer 51 provides the processor 70 and algorithms knowledge of whether the index vehicle 5 is accelerating or decelerating. Further, in examples in which a camera 93, radar system 44, or sonar system 46 are available, the processor 70 and algorithms have knowledge of whether the surrounding vehicles are accelerating or decelerating with respect to the index vehicle 5. This will provide warning to the driver of the index vehicle 5 of an imminent collision, for example, if the index vehicle 5 is decelerating (as determined by the accelerometer 51) and the following vehicle is accelerating (as determined by one or more of a camera 93, a radar system 44, or a sonar system 46. The radar system 44, sonar system 46, and/or the camera(s) 92 are also used to determine a distance between the vehicle and other vehicles/objects.

Further, in embodiments having an accelerometer 51, there are anticipated embodiments in which the processor 70 and algorithms determine if a collision has occurred with a high degree of accuracy, including (also in some embodiments) the location of the collision and the severity of the collision. Knowledge of a collision is derived from instantaneous acceleration (or deceleration) in any direction. Given current technology, the fastest car acceleration in 2017 is about 0 to 60 miles per hour in 2.5 seconds, which represents around about 1.09 g (one g is the acceleration due to gravity at the Earth's surface defined as 9.80665 meters per second squared, or 9.80665 newtons of force per kilogram of mass). Therefore acceleration greater than 1.1 g is likely to have been caused by a collision as such acceleration is not likely given current vehicle technology. Similarly, vehicles have a maximum deceleration of less than 1.0 g, by experienced drivers on dry road conditions, and with good tires. A deceleration greater than 1.1 g is likely caused by a collision. Thus any acceleration or deceleration of greater than 1.1 g defines a collision with a high likelihood of certainty. Such a collision is detected instantaneously at the time of occurrence. In some embodiments, notification of the collision is transmitted through the wide-area transceiver 17, and, in some embodiments, is reported to the appropriate authorities for immediate action. In addition, to the detection of the collision, in some embodiments, the magnitude of acceleration and/or deceleration and impact is also transmitted. For example, an absolute acceleration value or a classification of the collision: moderate, severe, or potentially lethal depending on the acceleration/deceleration. For example, a moderate is between 1.1 g and 5 g; a severe collision is between 5 g and 10 g; and a potentially lethal collision is anything over 10 g. The notification, including the magnitude of the collision, is important since severe collisions often require emergency medical services to save lives and minimize disability while a low impact fender bender collision often only requires exchange of information between those involved and/or arrival of a law enforcement person. Further, using the positioning system 91, in some embodiments, the location of the collision is also reported through the wide-area transceiver 17.

In all embodiments, it is anticipated that the image projection using the projectors 60 or the hologram projectors 62 are only activated when needed to warn of less-than-desirable or dangerous inter-vehicle (or inter-object) spacing. For example, if another vehicle is 200 feet behind the index vehicle 5, then the image projection using the projectors 60 or the hologram projectors 62 are not activated. The image projection using the projectors 60 or the hologram projectors 62 is initiated, for example, when the inter-vehicle spacing is less than what is deemed safe based upon the present conditions, including, for example, vehicle speeds, road conditions, tire conditions, vehicle data, reaction times, etc. For example, if the index vehicle 5 is moving at 60 mph and a trailing vehicle is moving at 70 mph, the delta speed is negative 10 mph. Any values less than zero indicates that the inter-vehicle distance is reducing and the trailing vehicle is catching up to the index vehicle 5. The projectors 60 or the hologram projectors 62 are activated to project the rear safety zone 200/200A/200B/200C once the trailing vehicle approaches the danger zone (or warning zone). It should be noted that the dimensions of the rear image of the index vehicle is proportional to the speed of the trailing vehicle, but image projection is activated only when the trailing vehicle approaches the safety deceleration distance of an average vehicle with adequate tires, breaking systems, etc. On the other hand, if the index vehicle 5 is moving at 70 mph and a trailing vehicle is moving at 60 mph, the delta speed is positive 10 mph. Any values greater than zero indicates that the inter-vehicle distance is increasing and the trailing vehicle is getting further away from the index vehicle 5. In this example, once the inter-vehicle distance is greater than the danger zone, the projectors 60 or the hologram projectors 62 are deactivated. Once the index vehicle 5 approaches a leading vehicle (one in front of the index vehicle 5), the roadway projecting devices 60 or the hologram projectors 62 are activated to project the front safety zone 210/210A/210B/210C to warn the driver of the index vehicle 5 not to follow the leading vehicle too closely.

Figure 7:
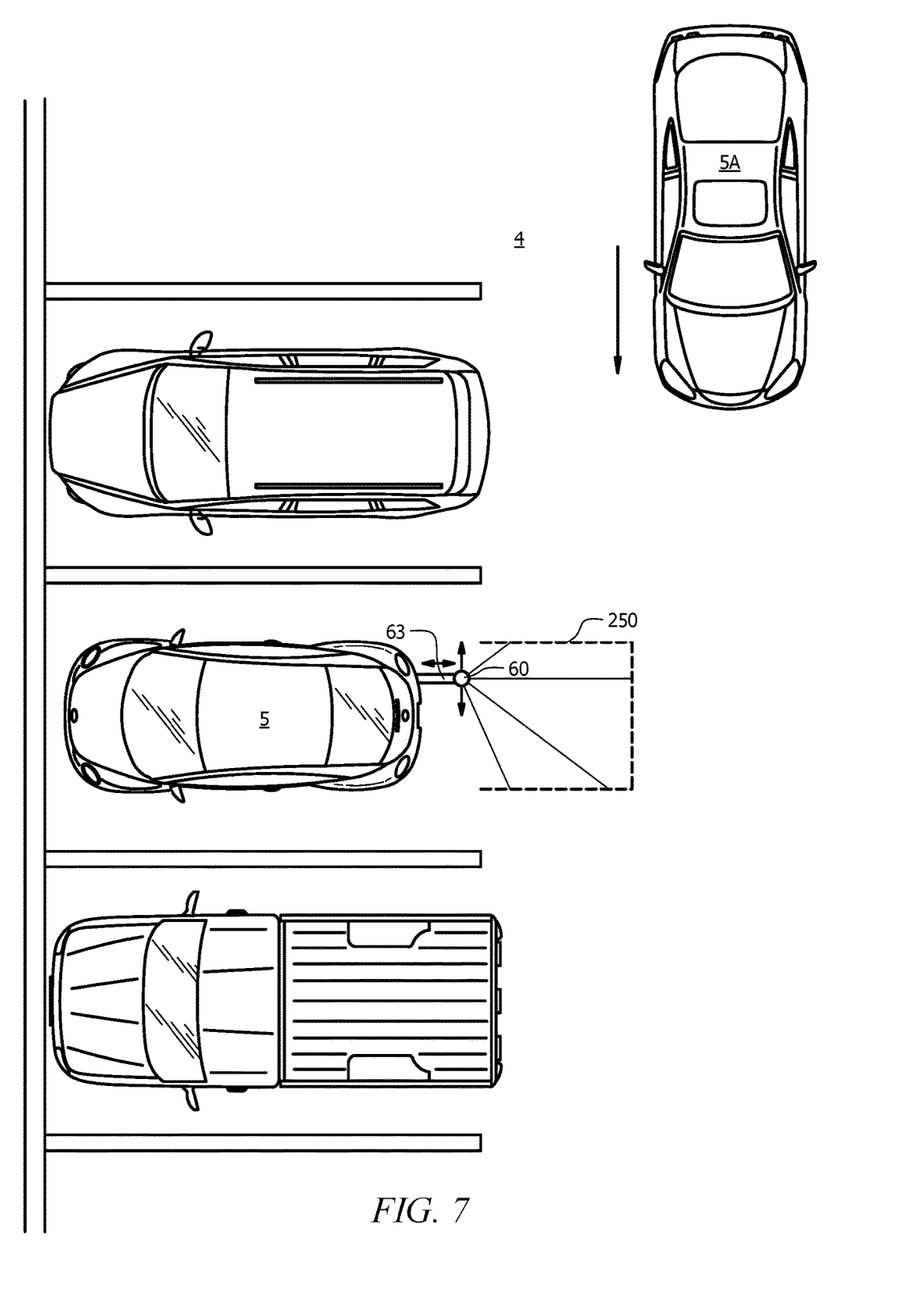
FIG. 7 illustrates a fifth schematic view of a vehicle with illumination zones of the system for avoiding accidents.

Referring to FIG. 7, a telescoping assembly 63 is shown extending from the rear of the index vehicle 5. As it is often difficult to back out of a parking space, the telescoping assembly 63 includes a projector that provides a projection 250 on the surface behind the index vehicle 5 that warns a driver of an approaching vehicle 5A as to where the index vehicle 5 will be traveling. Further, in some embodiments, the telescoping assembly 63 includes one or more cameras/lenses that image the parking area. The images from the cameras are then displayed, for example, on the dashboard display (see FIG. 9) to warn the driver of the index vehicle 5 that approaching vehicle 5A is near. In a preferred embodiment, the telescoping assembly 63 is either flexible or is hinged to reduce the chance of damage should an object come into contact with the telescoping assembly. In some embodiments, the telescoping assembly 63 includes sensors for detecting objects in the rearward path of the index vehicle 5 and to limit extension of the telescoping assembly 63 so as not to hit such objects.

Figure 8:
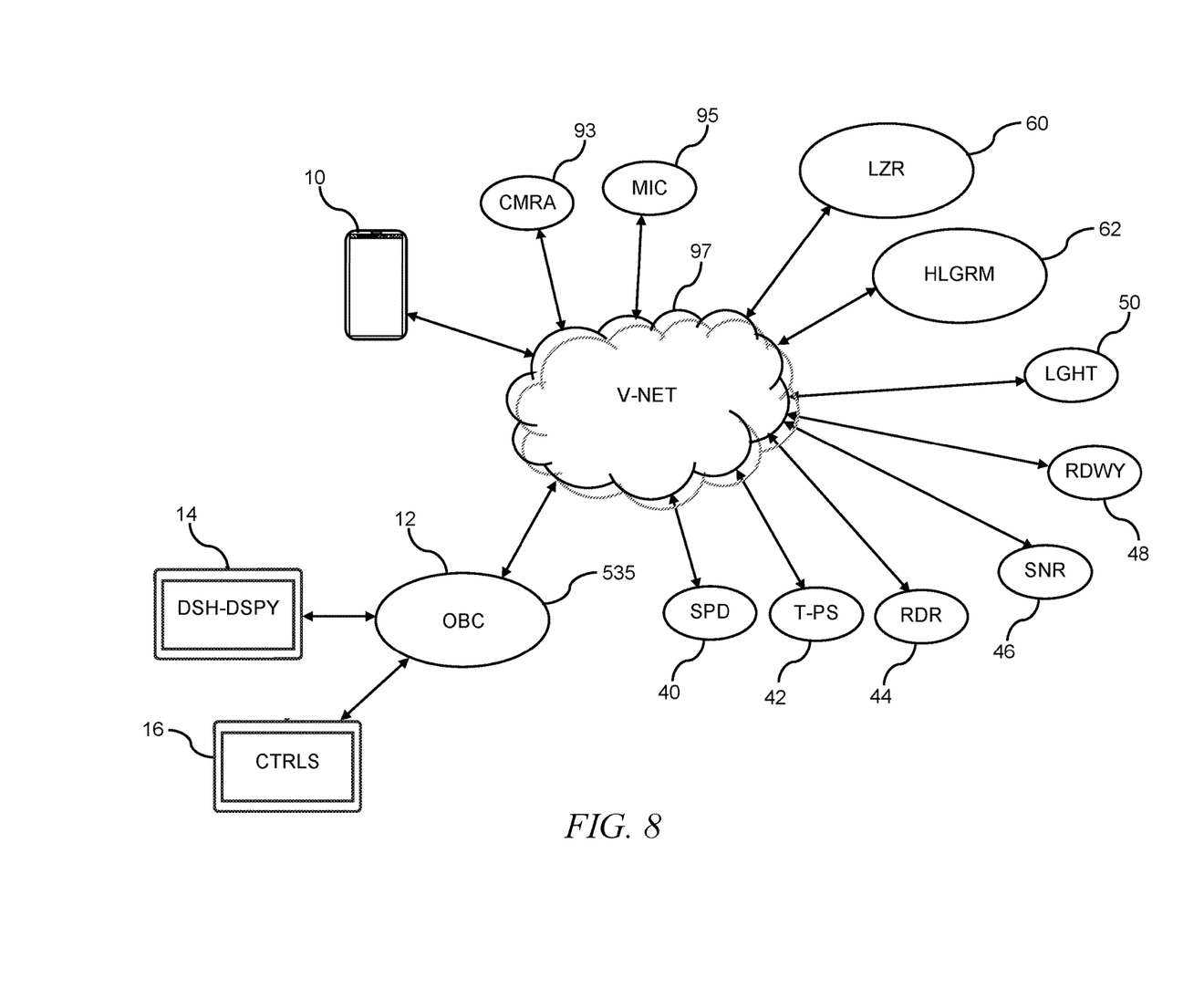
FIG. 8 illustrates a data connection diagram of the system for avoiding accidents.

Referring to FIG. 8, a data connection diagram of the exemplary system for avoiding accidents is shown. In this example, an on-board computer 12 (or any computing entity), communicates through a vehicle network 97 (e.g. car-area network or CAN, vehicle-area network or VAN, etc.) to various entities, some or all of which are included of the exemplary system for avoiding accidents.

As will be shown, the on-board computer 12 communicates with various input devices or sensors to obtain information regarding the speed of the vehicle, vehicle conditions, road conditions/weather, surrounding vehicles, etc. In this example, the input devices or sensors include, but are not limited to, a speed sensor 40, one or more tire pressure sensors 42, a radar system 44 (e.g. for sensing positions and speeds of other vehicles), a sonar system 46 (e.g. also for sensing positions and speeds of other vehicles, a roadway condition sensor 48 (e.g. for sensing the type of roadway and/or road conditions such as wet, dry, snow-covered, ice-covered, an ambient light sensor 50 (e.g. for determining ambient light), one or more cameras 93 (e.g. for sensing objects, other vehicles, etc.), and a microphone 95 (e.g. for measuring road noise to determine type of road surface). The on-board computer 12 also communicates with projecting devices 60/62. The projecting devices 60/62, under control of the on-board computer 12, project an image either onto the roadway (e.g. a laser projecting device) or into the space above the roadway (e.g. a holographic projecting device 62). It is anticipated that either or both of the projecting devices 60/62 are used in any embodiment of this invention.

For completeness, the vehicle network 97 (or the on-board computer 12) communicates with external devices 10 (e.g. a cellular phone or a maintenance computer) either by direct connection through a service connector (not shown, but known in the industry) or through a wireless interface such as Bluetooth through a Bluetooth radio transceiver 94 (see FIG. 2) or Wi-Fi through a Wi-Fi radio transceiver 96 (see FIG. 2).

In a preferred embodiment, the on-board computer 12 interfaces to a dashboard display 14 (e.g., gauges, illuminating icons, graphics display, etc.) for displaying various information and to one or more controls 16 (e.g. accelerator, brakes, switchers).

In some embodiments, a wide-area transceiver 17 is included for communicating with external systems through, for example, the cellular network. When present, the wide-area transceiver 17 is capable of transmitting location information from the positioning system 91 to a remote location, automatically, in the event of an accident. In some embodiments, the wide-area transceiver 17 operates on a dedicated wide-area network or on a public wide-area network such as communicating with cell towers in a cellular network.

In some embodiments, an accelerometer 51 is included to measure vehicle acceleration and deceleration (negative acceleration). The accelerometer 51, when present, will be used, for example, to determine if a collision has occurred, for example when a reading from the accelerometer 51 exceeds 1.1 g.

Figure 9:
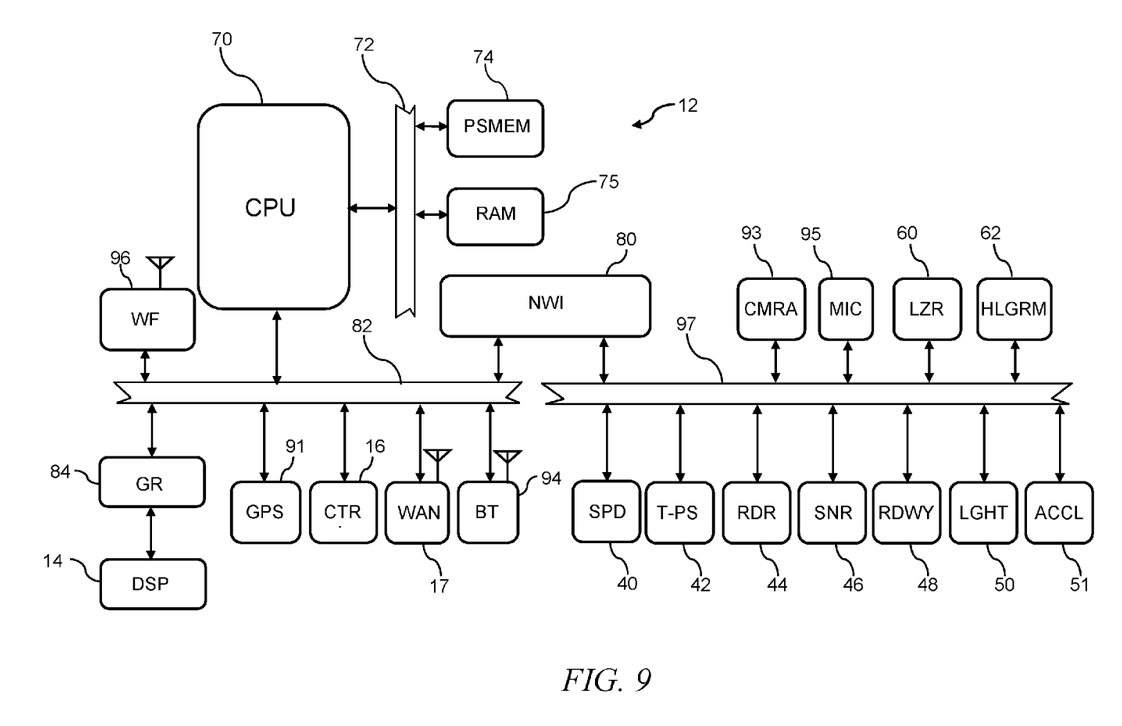
FIG. 9 illustrates a schematic view of the system for avoiding accidents.

Referring to FIG. 9, a schematic view of a typical computing system of the exemplary system for avoiding accidents is shown. Although any computing entity is anticipated, for clarity purposes, an on-board computer 12 will be used in the remainder of the description.

The exemplary system for avoiding accidents is described using a processor-based on-board computer 12 for providing standard vehicle-wide operation as known in existing vehicles. The present invention is in no way limited to using the on-board computer 12 to perform calculations, measure data, and/or calculate image projections, as any computing entity is anticipated. The on-board computer 12 is shown as one way of implementing the present application utilizing existing computational power within the vehicle. It is fully anticipated that different architectures are known that accomplish similar results in a similar fashion and the present invention is not limited in any way to any particular vehicular architecture or implementation.

In this example, a processor 70 executes or runs programs in a random-access memory 75. The programs are generally stored within a persistent memory 74 and loaded into the random-access memory 75 when needed. The processor 70 is any processor, typically a processor designed for vehicles. The persistent memory 74 and random-access memory 75 are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary on-board computers 12, the persistent memory 74 is removable, in the form of a memory card of appropriate format such as SD (secure digital) cards, micro SD cards, compact flash, etc.

Also, connected to the processor 70 is a system bus 82 for connecting to peripheral subsystems such as a graphics adapter 84 and an input interface to various controls 16. The graphics adapter 84 receives commands from the processor 70 and controls what is depicted on the dashboard display 14. The controls 16 provide navigation and selection of vehicle features (e.g. turn signals, audio controls, horn, etc.).

In general, some portion of the persistent memory 74 is used to store programs, executable code, and data, etc. It is anticipated that the data includes one or more specification parameters regarding the vehicle such as weight, stopping distance, acceleration parameters, length, width, tire tread data, tire tread wear predictions, etc. In some embodiments, this data is used to determine the safety zone around the vehicle. In some embodiments, other data is stored in the persistent memory 74 such as audio files, video files, text messages, etc.

In some embodiments, positioning system 91 (e.g. a global positioning or GPS system) is interface to the processor bus 82. In some embodiments, the exemplary system for avoiding accidents utilizes data from the positioning system 91 to determine speed/velocity of the vehicle, time-of-day, road type, etc.

In many embodiments of the present invention, a Bluetooth radio transceiver 94 and/or a Wi-Fi radio transceiver 96 are included for communicating with other devices or with peripherals/sensors that are interfaced to the vehicle.

As known in the industry, many vehicles utilize a vehicle network 97 (e.g. car-area network or CAN, vehicle-area network or VAN, etc.) for communicating with various entities, some or all of which are included of the exemplary system for avoiding accidents. In this example, a vehicle network interface 80 interfaces between the system bus 82 and the vehicle network 97 (e.g. car-area network or CAN, vehicle-area network or VAN, etc.).

In this example, the input devices or sensors include, but are not limited to, a speed sensor 40, one or more tire pressure sensors 42, a radar system 44 (e.g. for sensing positions and speeds of other vehicles), a sonar system 46 (e.g. also for sensing positions and speeds of other vehicles, a roadway condition sensor 48 (e.g. for sensing the type of roadway and/or moisture on the roadway), an ambient light sensor 50 (e.g. for determining ambient light), one or more cameras 93 (e.g. for sensing objects, other vehicles, etc.), and one or more microphones 95 (e.g. for measuring road noise to determine type of road surface). The on-board computer 12 also communicates through the vehicle network 97 with projecting devices 60/62 for projecting an image either onto the roadway (e.g. a roadway projecting devices 60) or into the space above the roadway (e.g. a holographic projecting device 62). It is anticipated that either or both of the projecting devices 60/62 are used in any embodiment of this invention.

Figure 10:
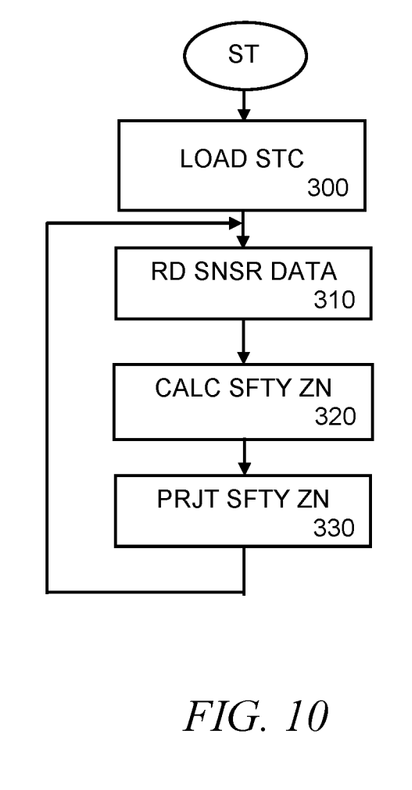
FIG. 10 illustrates a first flow chart of the system for avoiding accidents.
Figure 11:
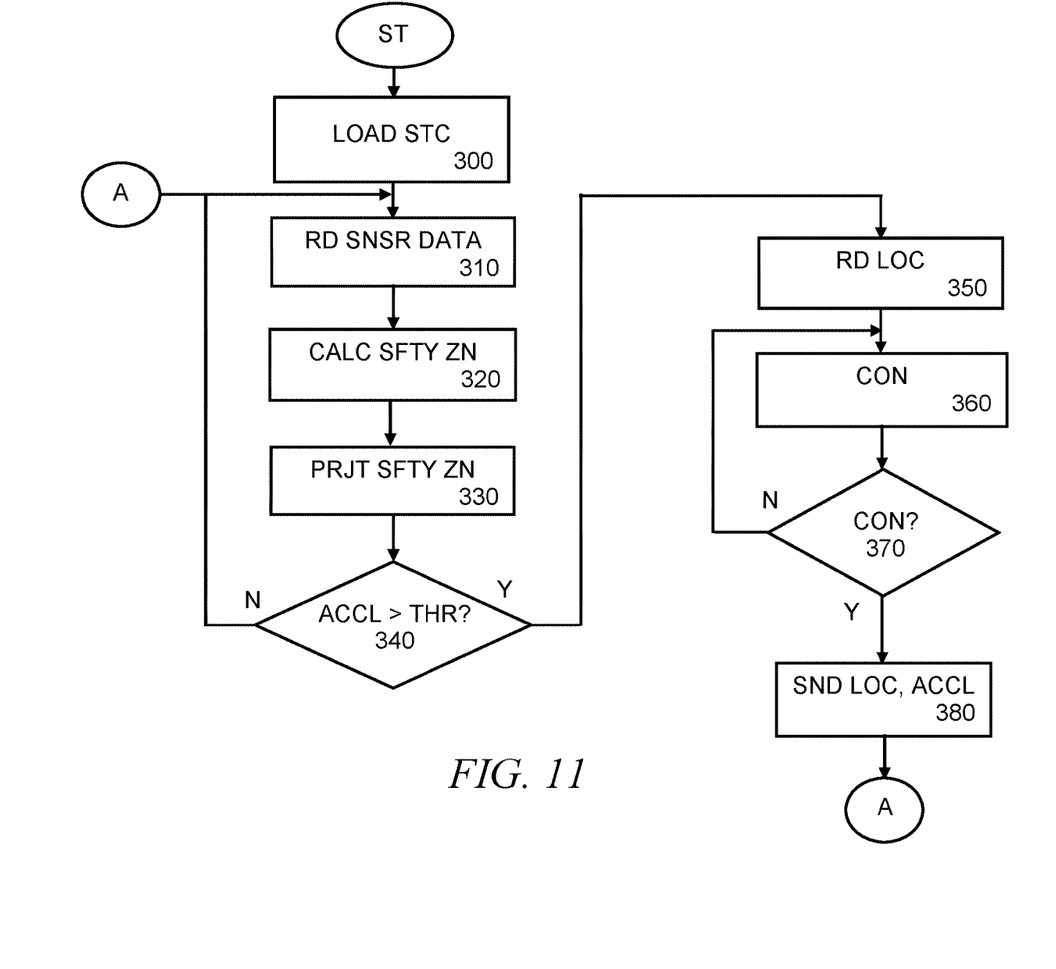
FIG. 11 illustrates a first flow chart of the system for avoiding accidents.

Referring to FIGS. 10 and 11 exemplary flow charts of the system for avoiding accidents are shown. In both examples, software running on the processor 70 reads 300 static data such as the vehicle weight, vehicle braking power, vehicle acceleration ability, vehicle dimensions, etc. The static data is typically preprogrammed and stored in persistent memory 74. The software then enters a loop. Each time through the loop, the software reads 310 sensor data from one or of the sensors, for example, the speed sensor 40, one or more tire pressure sensors 42, the radar system 44 (e.g. for sensing positions and speeds of other vehicles), the sonar system 46 (e.g. also for sensing positions and speeds of other vehicles, the roadway condition sensor 48 (e.g. for sensing the type of roadway and/or moisture on the roadway), the ambient light sensor 50 (e.g. for determining ambient light), one or more cameras 93 (e.g. for sensing objects, other vehicles, etc.), and/or the microphone 95 (e.g. for measuring road noise to determine type of road surface). From the stored data and the sensor data, the software calculates 320 each of the safety zones (e.g. the safe inter-vehicle distance) and then projects 330 the safety zones, for example in front and behind the index vehicle 5.

In FIG. 11, an additional test 340 is performed to determine if the acceleration (or deceleration) is greater than a predetermined threshold (e.g. greater than 1.1 gravitational forces). Note that it is anticipated that there be different thresholds for each directional axis of the index vehicle 5. For example, one threshold for acceleration, another threshold for deceleration, and still another for sideways acceleration in either direction. If the test 340 determines that the acceleration (or deceleration) is not greater than a predetermined threshold, the loop continues. If the test 340 determines that the acceleration (or deceleration) is greater than a predetermined threshold, a notification step is initiated. Although there are many ways anticipated to notify, in the example shown, the software reads 350 the location of the index vehicle 5 from the positioning system 91 then initiates a connection 360 to a remote system. A test 370 is made to determine if the connection succeeded. If the test 370 determines that the connection failed, the connection 360 is repeated until the test 370 determines that the connection succeeded, after which data is sent 380 to the remote system. The data that is sent 380 includes, for example, an identification of the vehicle, the location, the peak measured acceleration or deceleration, the time, other conditions as read by the sensors, etc. The remote system, upon receiving the data, reviews the data to determine what type of response needs to be made. For example, if the acceleration or deceleration is very high, an ambulance or life-flight is dispatched. If the acceleration or deceleration is low, an officer is dispatched, etc.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A collision avoidance system comprising:
    an image projection system interfaced to an index vehicle and the image projection system configured to project an image on a roadway behind the index vehicle;
    one or more sensors interfaced to the index vehicle;
    a computer, the computer having preprogrammed data regarding the index vehicle, the computer interfaced to the one or more sensors, obtaining sensor data from the one or more sensors, and the computer operatively coupled to the image projection system for controlling projection of the image;
    the computer operatively configured to execute software that operates the computer to iteratively calculate a size of a safety zone based upon the preprogrammed data and the sensor data, the software operates the computer to control the image projection system to project the image on the roadway behind the index vehicle that is the size of the safety zone; and
    wherein a collision is detected when the rate of change of the size of the safety zone exceeds a predetermined value that corresponds to an acceleration or a deceleration of greater than 1.1 g.

2. The collision avoidance system of claim 1, wherein the image projection system emits a flat image for illuminating a surface behind the index vehicle.

3. The collision avoidance system of claim 1, wherein the image projection system emits a holographic image behind the index vehicle.

4. The collision avoidance system of claim 1, wherein the preprogrammed data includes at least one preprogrammed data item selected from the group consisting of a weight of the index vehicle, a stopping ability of the index vehicle, and tire tread data of the index vehicle.

5. The collision avoidance system of claim 1, wherein the sensor data includes at least one sensor data item selected from the group consisting of a speed of the index vehicle, a type of surface on which the index vehicle is traveling, a weather condition, a road surface condition, and an ambient light at the index vehicle.

6. The collision avoidance system of claim 5, wherein the weather condition includes an indication of at least one weather item selected from the group consisting of rain, ice, sleet, fog, and snow.

7. The collision avoidance system of claim 1 further comprising:
    a second image projection system interfaced to the index vehicle and capable of projecting a second image on the roadway in front of the index vehicle;
    means for determining a distance between the index vehicle and a second vehicle that is in front of the index vehicle; and
    the software further operates the computer to iteratively calculate a size of a forward safety zone based upon the preprogrammed data, the sensor data, and the distance between the index vehicle and the second vehicle, responsively, the software further operates the computer to control the second image projection system to project the second image on the roadway in front of the index vehicle that is proportional to the size of the forward safety zone.

8. The collision avoidance system of claim 7, wherein the means for determining the distance between the index vehicle and the second vehicle comprises one or more cameras.

9. The collision avoidance system of claim 7, wherein the means for determining the distance between the index vehicle and the second vehicle comprises a sonar system.

10. The collision avoidance system of claim 7, wherein the means for determining the distance between the index vehicle and the second vehicle comprises a radar system.

11. The collision avoidance system of claim 7, wherein the second image projection system emits a flat image for illuminating a surface in front of the index vehicle.

12. The collision avoidance system of claim 7, wherein the second image projection system emits a holographic image in front of the index vehicle.

13. The collision avoidance system of claim 7, further comprising a telescoping assembly that extends from and retracts back into a rear surface of the index vehicle, the telescoping assembly includes one or more cameras for viewing other vehicles behind the index vehicle.

14. The collision avoidance system of claim 13, wherein the telescoping assembly comprises an object detection sensor and data from the object detection sensor is utilized to limit extension of the telescoping assembly so as to avoid hitting an object behind the index vehicle.

15. A method of avoiding a collision comprising:
    measuring a speed of an index vehicle and at least one parameter selected from the group consisting of a road surface type, a road condition, a weather, and a tire pressure;
    calculating a rear safety zone from the speed of the index vehicle, the at least one other parameter, and at least one preprogrammed parameter related to the index vehicle;
    projecting an image behind the index vehicle on a roadway, a size of the image projected behind the index vehicle on the roadway being proportional to the rear safety zone; and
    wherein a collision is detected when the rate of change of the size of the rear safety zone exceeds a predetermined value that corresponds to an acceleration or a deceleration of greater than 1.1 g.

16. The method of claim 15, wherein in the step of projecting the image, the image is a holographic image.

17. The method of claim 15, wherein the road condition is selected from the group consisting of wet, dry, snow-covered, and ice-covered.

18. The method of claim 15, further comprising the steps of:
determining a forward vehicle speed of a leading vehicle that is traveling in front of the vehicle;
calculating a front safety zone from the speed of the vehicle, the forward vehicle speed, the at least one other parameter, and at least one preprogrammed parameter related to the vehicle; and
projecting a second image on the roadway in front of the vehicle, a second size of the second image projected on the roadway in front of the vehicle being proportional to the front safety zone.

19. A collision avoidance system comprising:
an image projection system interfaced to a rear surface of an index vehicle, the image projection system being operative to project an image on a roadway behind the index vehicle;
one or more sensors interfaced to the index vehicle, at least one of the one or more sensors measuring a speed of the index vehicle;
a computer, the computer interfaced to the one or more sensors, obtaining sensor data from the one or more sensors, the sensor data including the speed of the index vehicle, and the computer operatively coupled to the image projection system for controlling projection of the image;
the computer having software that iteratively calculates a size of a safety zone the sensor data that includes the speed of the vehicle, and the software controlling the image projection system to project the image on the roadway behind the index vehicle that is proportional to the size of the safety zone; and
wherein a collision is detected when the rate of change of the size of the rear safety zone exceeds a predetermined value that corresponds to an acceleration or a deceleration of greater than 1.1 g.

20. The collision avoidance system of claim 19, wherein the image projection system emits a type of image on the roadway selected from a flat image and a holographic image.

21. A collision detection system comprising:
an image projection system interfaced to an index vehicle and the image projection system configured to project an image on a roadway behind the index vehicle;
one or more sensors interfaced to the index vehicle;
a computer, the computer having preprogrammed data regarding the index vehicle, the computer interfaced to the one or more sensors, obtaining sensor data from the one or more sensors, and the computer operatively coupled to the image projection system for controlling projection of the image on the roadway; and
the computer operatively configured to execute software that operates the computer to iteratively calculate a size of a safety zone based upon the preprogrammed data and the sensor data, the software operates the computer to control the image projection system to project the image on the roadway behind the index vehicle that is the size of the safety zone;
wherein a collision is detected when the rate of change of the size of the safety zone exceeds a predetermined value that corresponds to an acceleration or a deceleration of greater than 1.1 g.

22. The collision detection system of claim 21, wherein, if the rate of change of the size of the safety zone exceeds a second predetermined value that corresponds to the acceleration or the deceleration being greater than 10 g, the collision is deemed severe.

23. The collision detection system of claim 21, wherein, after the collision is detected, a notification is transmitted requesting emergency services.

24. The collision detection system of claim 21, wherein, the acceleration or the deceleration is detected by stationary sensors exterior to the index vehicle, the stationary sensors being operatively coupled to transmit requests for emergency services.

* * * * *